United States Patent
Wright

(10) Patent No.: US 11,973,361 B1
(45) Date of Patent: Apr. 30, 2024

(54) OVERHEATING PROTECTION SYSTEM

(71) Applicant: James K. Wright, Paris, TX (US)

(72) Inventor: James K. Wright, Paris, TX (US)

(*) Notice: Subject to any disclaimer, the term of this patent is extended or adjusted under 35 U.S.C. 154(b) by 57 days.

(21) Appl. No.: 15/937,487

(22) Filed: Mar. 27, 2018

Related U.S. Application Data

(60) Provisional application No. 62/476,912, filed on Mar. 27, 2017.

(51) Int. Cl.
*H02J 7/04* (2006.01)
*G06F 1/26* (2006.01)
*H01R 31/08* (2006.01)
*H02H 5/04* (2006.01)
*H02H 7/18* (2006.01)
*H02J 7/00* (2006.01)
*H02J 7/02* (2016.01)

(52) U.S. Cl.
CPC ...... *H02J 7/00302* (2020.01); *H02J 7/00309* (2020.01); *H02J 7/0042* (2013.01)

(58) Field of Classification Search
None
See application file for complete search history.

(56) References Cited

U.S. PATENT DOCUMENTS

| | | | | |
|---|---|---|---|---|
| 6,140,905 A * | 10/2000 | Shoji | ............... | H01M 50/574 |
| | | | | 439/620.28 |
| 7,034,375 B2 * | 4/2006 | Kang | ............... | H01H 37/52 |
| | | | | 257/467 |
| 7,910,834 B2 * | 3/2011 | McGinley | ............... | H02J 7/0042 |
| | | | | 174/112 |
| 8,456,137 B2 * | 6/2013 | Schwartz | ............... | H02J 9/005 |
| | | | | 361/114 |
| 9,007,033 B2 * | 4/2015 | Li | ............... | H02J 7/04 |
| | | | | 320/153 |
| 2009/0316321 A1 * | 12/2009 | Ouwerkerk | ............... | B60L 53/16 |
| | | | | 361/103 |
| 2012/0062385 A1 * | 3/2012 | Wiesemann | ............... | H01R 13/717 |
| | | | | 439/345 |
| 2015/0130402 A1 * | 5/2015 | O'Neill | ............... | H02J 7/0013 |
| | | | | 320/155 |
| 2016/0082852 A1 * | 3/2016 | Kim | ............... | G01K 7/16 |
| | | | | 439/620.21 |
| 2016/0322803 A1 * | 11/2016 | Zaidi | ............... | H02H 3/025 |
| 2017/0108910 A1 * | 4/2017 | Goh | ............... | G06F 13/385 |

* cited by examiner

*Primary Examiner* — Richard Isla
*Assistant Examiner* — Javier A. Bernal Sosa
(74) *Attorney, Agent, or Firm* — Richard Eldredge; LEAVITT & ELDREDGE

(57) ABSTRACT

An overcharging protection system monitors the temperature of a cable used to transfer electricity from a power source to a personal electronic device. If the temperature as detected by a thermometer device of a sensor crosses a threshold, a bridge of a cutoff device is retracted disconnecting the two pieces of the cable to prevent any further increase in temperature due to charging. The thermometer device and cutoff device are housed in the interior space of a casing. The casing attaches to the cable.

1 Claim, 5 Drawing Sheets

OVERHEATING PROTECTION SYSTEM

BACKGROUND

1. Field of the Invention

The present invention relates generally to personal electronic devices, and more specifically, to a overheating prevention system that ensures that the battery or other components of a personal electronic device are not damaged by the temperature caused by overcharging the device.

2. Description of Related Art

Personal electronic devices are well known in the art and are effective means to of communicating, taking pictures, playing music along with various other capabilities. For example, FIG. 1 depicts a conventional personal electronic device charging system 101 having a personal electronic device 103 attached to a power source 105 via a cable 107. During use, electricity from the power source 105 is transferred to the device 103 via the cable 107.

One of the problems commonly associated with system 101 is that the battery of another component can be damaged by overcharging. For example, batteries are known to combust if their temperature reaches a certain point not uncommon during the charging process.

Accordingly, although great strides have been made in the area of personal electronic device charging systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
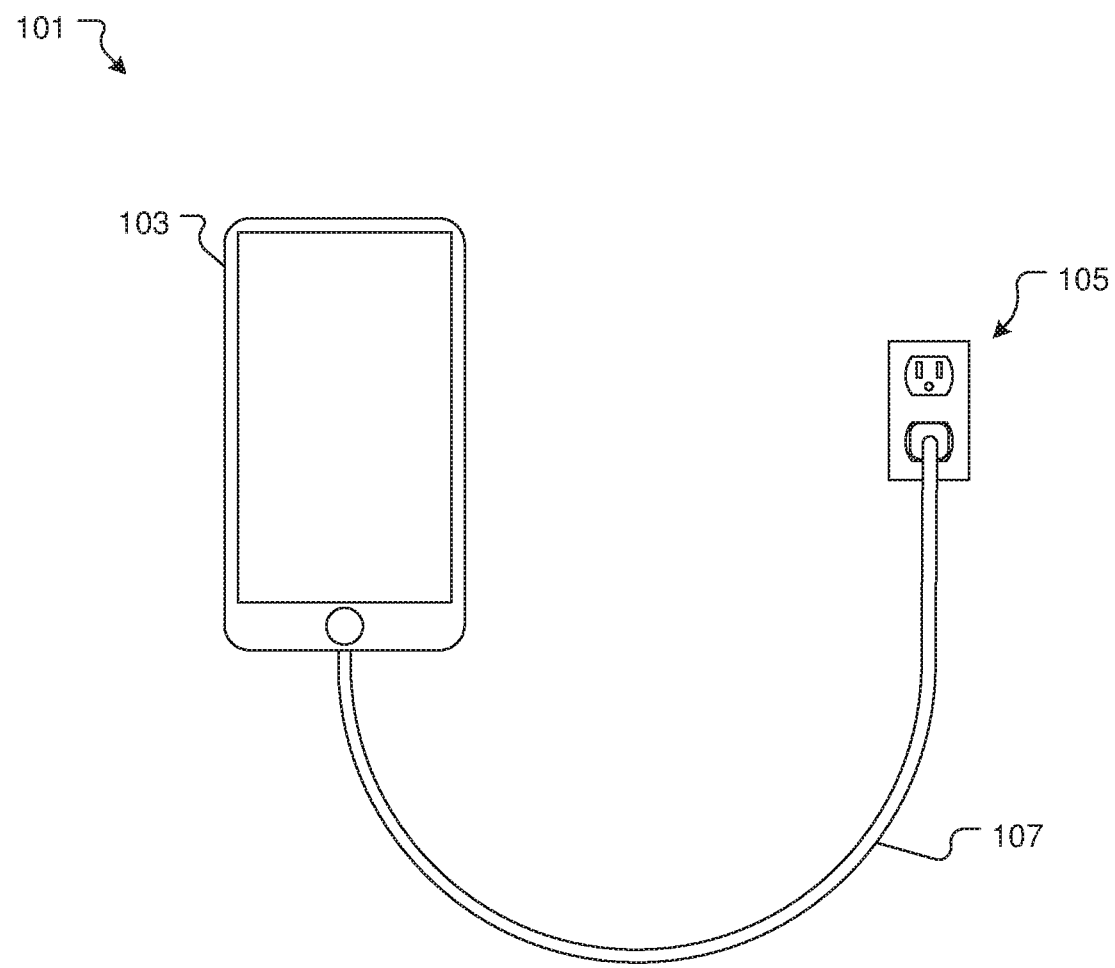
FIG. 1 is a front view of a common personal electronic device charging system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional personal electronic device charging systems. Specifically, the system of the present application regulates the charging of the device by monitoring the temperature. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
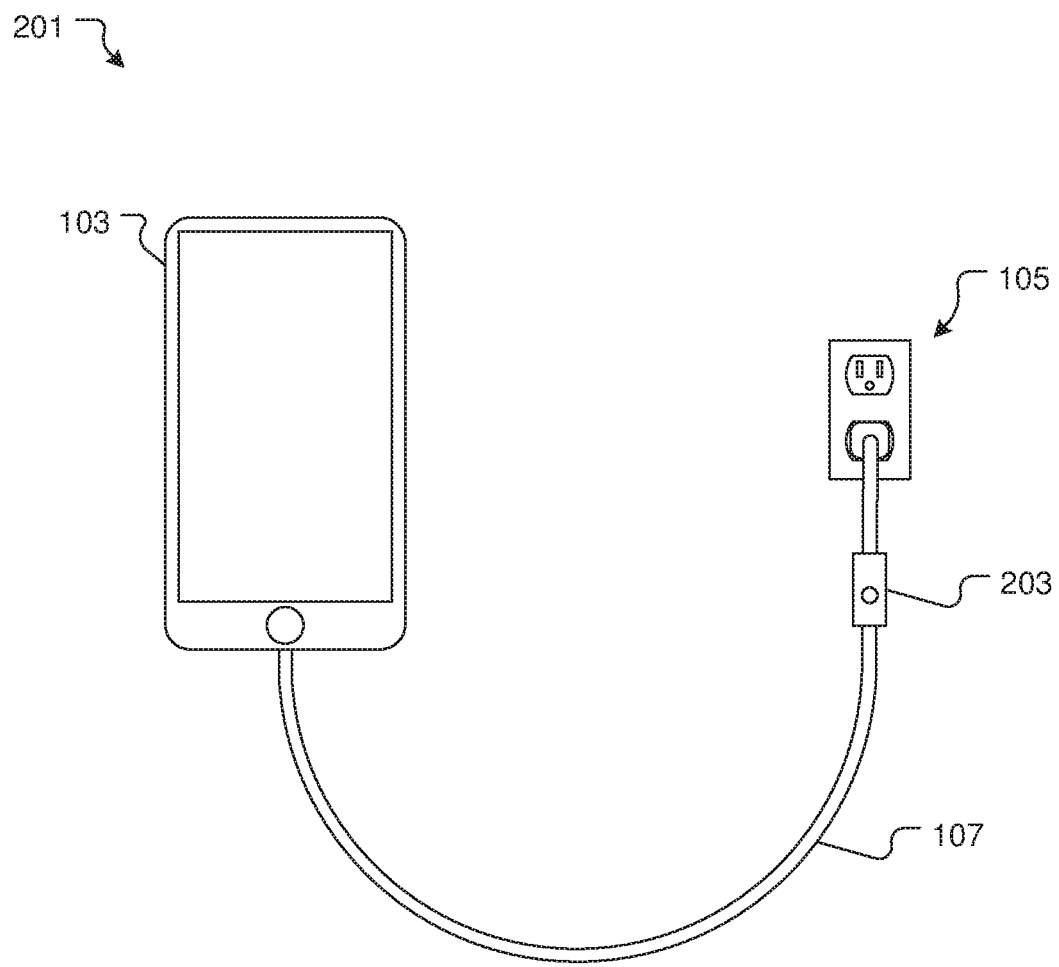
FIG. 2 is a front view of an overheating protection system in accordance with a preferred embodiment of the present application.

Referring now to the drawings wherein like reference characters identify corresponding or similar elements throughout the several views, FIG. 2 depicts a front view of a overheating protection system in accordance with a preferred embodiment of the present application. It will be appreciated that system 201 overcomes one or more of the above-listed problems commonly associated with conventional personal electronic device charging systems.

In the contemplated embodiment, system 201 includes the components of a personal electronic device charging system 101 with a charging temperature sensor 203 removably attached to the cable 107.

Figure 3A:
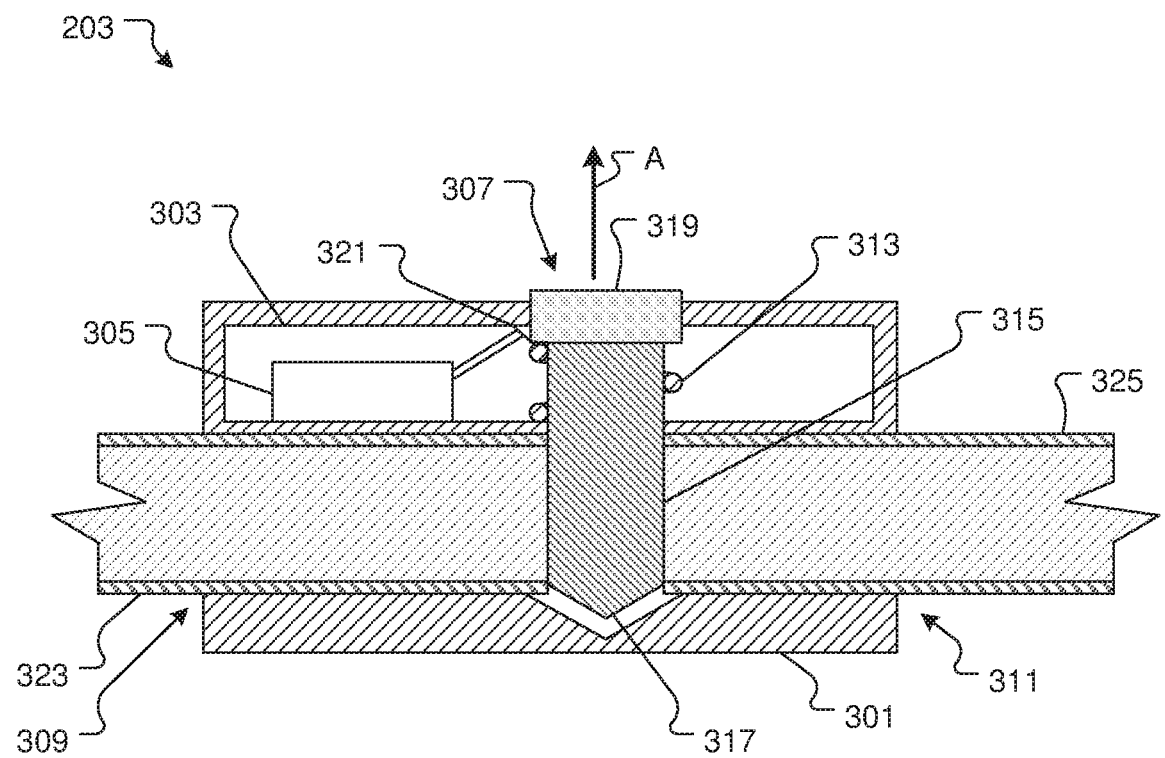
FIGS. 3A and 3B are cross-sectional side views of the sensor of FIG. 2.
Figure 3B:
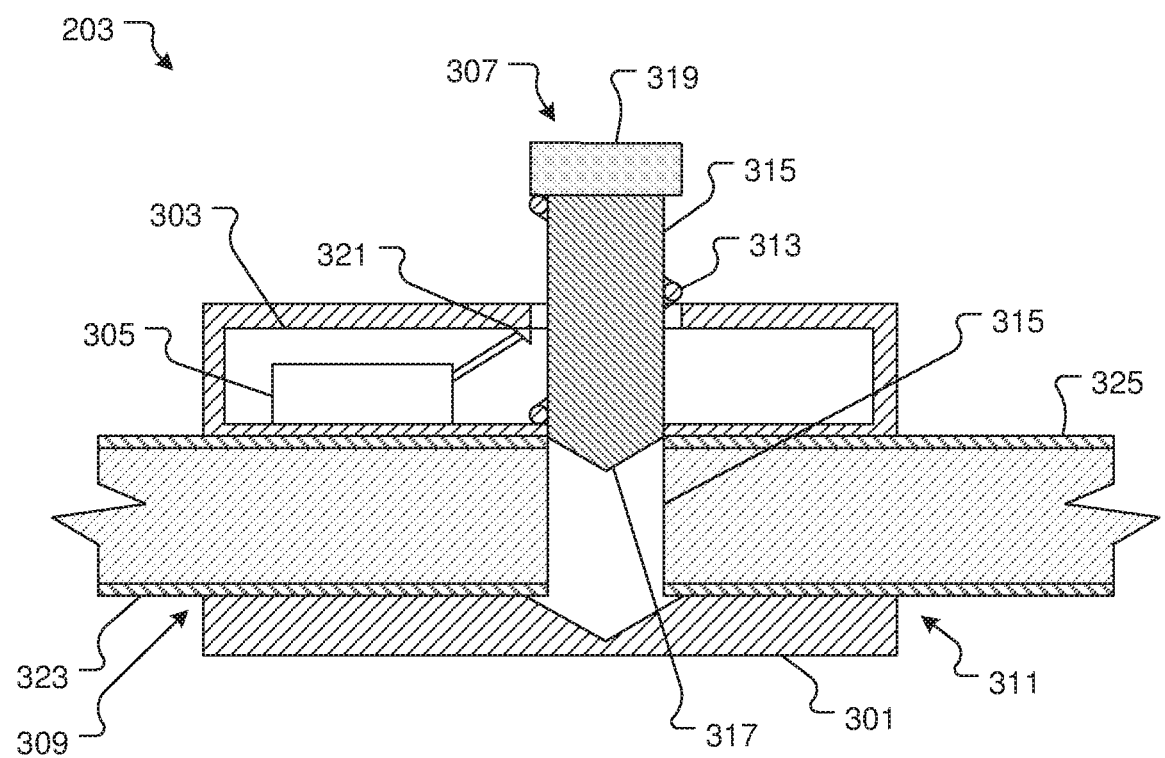

Referring to FIGS. 3A and 3B, the sensor 203 including a casing 301 that encloses an interior space 303 that houses a thermometer device 305 and a cutoff device 307. The casing 301 is configured to fit around the cable 107 and rigidly hold the cable 107 on a first side 309 and a second side 311. The thermometer 305 is situated to be in proximity to the cable 107 and detect its temperature.

The cutoff device 307 having a spring 313 attached to a bridge 315. The bridge 315 having a sharp end 317. The bridge 315 having a button 319 rigidly attached opposite the sharp end 317. The cutoff device 307 having a latch 321 movably attached and configured to hold the bridge in place until released by the temperature device 305.

After the sensor 203 is initially attached to the cable 107 the sharp edge 317 of the bridge 315 is forced through the cable 107 cutting it in two pieces 323, 325 by pressing on the button 319. The bridge 315 is composed of conductive material so that electricity can flow from one piece 323 to the other 325 through the bridge 315.

In use, the thermometer 305 is calibrated so that when the cable 107 reaches a set temperature the bridge 315 of the cutoff device 307 is removed from the cable 107, as depicted by motion A, stopping the flow of electricity to the personal electronic device 103.

It should be appreciated that one of the unique features believed characteristic of the present application is that cutoff device 307 severs the cable 107 while placing a bridge 315 between the two resulting pieces 323, 325 of the cable 107. It will be appreciated that in this manner the system 201 is able to control the flow of electricity to a personal electronic device 103 to prevent over charging and damage resulting therefrom.

Figure 4:
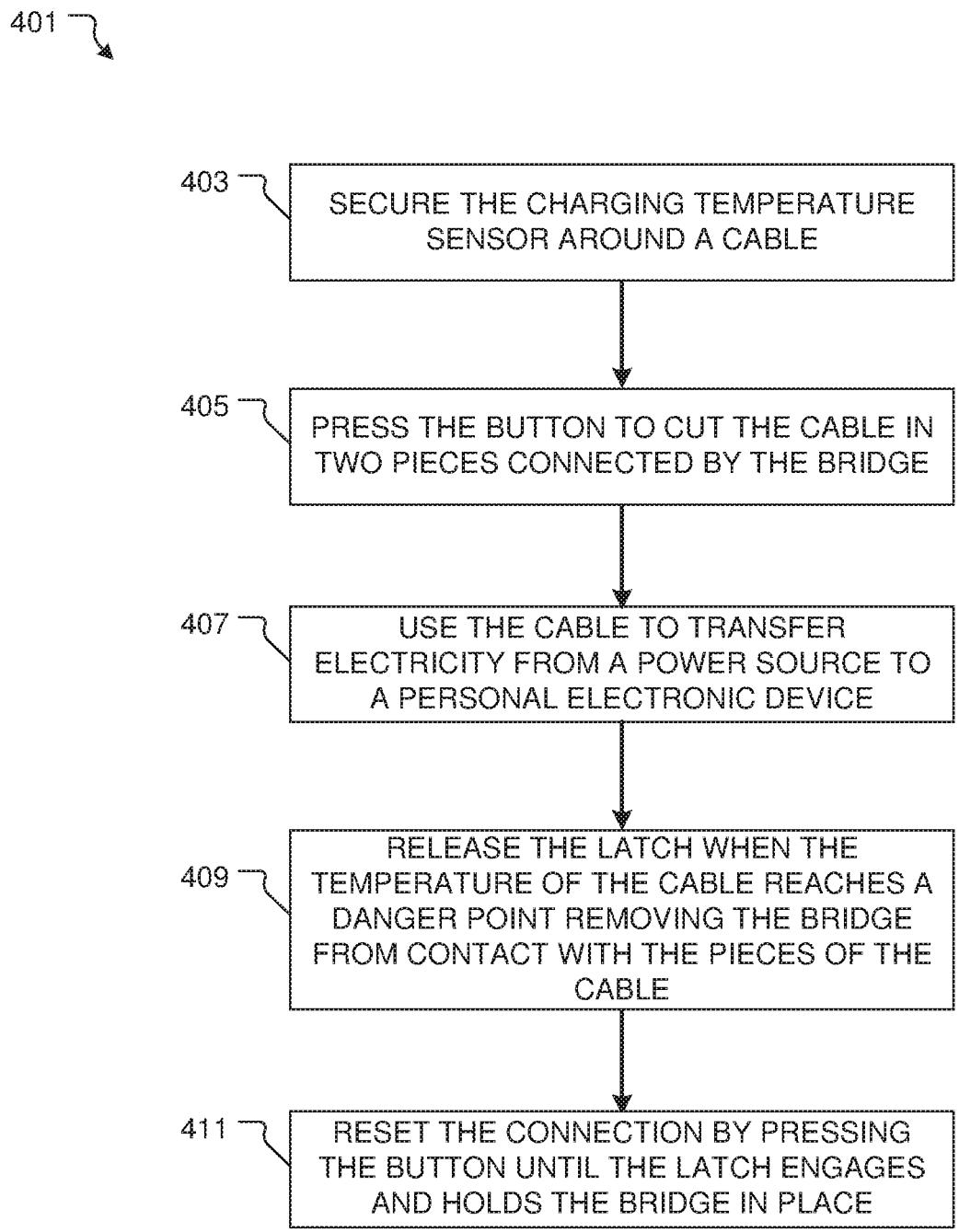
FIG. 4 is a flowchart of the preferred method of use of the system of FIG. 2.

Referring now to FIG. 4 the preferred method of use of the system 201 is depicted. Method 401 including securing the charging temperature sensor around a cable 403, pressing the button to cut the cable in two pieces connected by the bridge 405, using the cable to transfer electricity from a power source to a personal electronic device 407, releasing the latch when the temperature of the cable reaches a danger point, removing the bridge from contact with the pieces of the cable 409 and resetting the connection by pressing the button until the latch engages and holds the bridge in place 411.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. An overcharging protection system comprising:
   a charging temperature sensor attached to a cable that transfers electricity from a power source to a personal electronic device, the charging temperature sensor is removably attached to the cable;
   the charging temperature sensor including:
      a casing forming an interior space that the cable travels therethrough;
      a thermometer positioned with the interior space and configured to measure the temperature of the cable; and
      a cutoff device, with a latch and a bridge, that is spring-loaded and extends within the interior space, the cutoff device is configured to cut the cable into two pieces and place the bridge in contact between them;
   wherein the thermometer sensor monitors the temperature of the cable and, if the temperature reaches a dangerous level, it releases the latch in order to retract the bridge from contact with the pieces of the cable.

* * * * *